(12) United States Patent
Matsuzaki et al.

(10) Patent No.: US 8,015,614 B2
(45) Date of Patent: Sep. 6, 2011

(54) INFORMATION SECURITY DEVICE (75) Inventors: Natsume Matsuzaki, Osaka (JP); Kaoru Yokota, Hyogo (JP); Masao Nonaka, Osaka (JP)

(73) Assignee: Panasonic Corporation, Osaka (JP)

( * ) Notice: Subject to any disclaimer, the term of this patent is extended or adjusted under 35 U.S.C. 154(b) by 932 days.

(21) Appl. No.: 11/916,587

(22) PCT Filed: Jun. 9, 2006

(86) PCT No.: PCT/JP2006/311645
§ 371 (c)(1),
(2), (4) Date: Dec. 5, 2007

(87) PCT Pub. No.: WO2006/132371
PCT Pub. Date: Dec. 14, 2006

(65) Prior Publication Data
US 2010/0023774 A1 Jan. 28, 2010

(30) Foreign Application Priority Data
Jun. 10, 2005 (JP) ................................. 2005-170629

(51) Int. Cl.
G06F 7/04 (2006.01)
G06F 17/30 (2006.01)
H04N 7/16 (2006.01)
(52) U.S. Cl. .............. 726/26; 726/2; 713/157; 713/168; 380/59; 380/277
(58) Field of Classification Search .......................... None
See application file for complete search history.

(56) References Cited

U.S. PATENT DOCUMENTS
5,857,077 A    1/1999  Nakagaki et al.
6,023,509 A *  2/2000  Herbert et al. .................. 705/76

(Continued)

FOREIGN PATENT DOCUMENTS
JP    9-050410     2/1997
JP    11-175202    7/1999
JP    11-219329    8/1999
JP    2001-256413  9/2001
JP    2005-136505  5/2005

OTHER PUBLICATIONS

International Search Report issued Aug. 29, 2006 in the International (PCT) Application of which the present application is the U.S. National Stage.

(Continued)

*Primary Examiner* — Nasser Moazzami
*Assistant Examiner* — Oscar A Louie
(74) *Attorney, Agent, or Firm* — Wenderoth, Lind & Ponack, L.L.P.

(57) ABSTRACT

An information security device is provided that, when information is circulated through a chain, permits changing of a usage rule for the information or collection (deletion) of the information after the circulation.

An information security device (200) includes: a receiving unit (201) that receives a content and a collection command; a content storing unit (202) that stores a content and its usage rule; a collection command confirmation unit (203) that checks the validity of a received collection command; a content deletion unit (204) that deletes a content; a chain information storage unit (205) that stores chain information containing sending and receiving information of a content; a destination list storage unit (206); a sending unit (207) that sends a content and a collection command; and a control unit (208) that controls the processing for a collection command. When a collection command is sent after content distribution, the content can be collected (deleted) in the destination of circulation.

21 Claims, 9 Drawing Sheets

U.S. PATENT DOCUMENTS

| | | | |
|---|---|---|---|
| 6,119,228 | A | 9/2000 | Angelo et al. |
| 6,178,505 | B1 * | 1/2001 | Schneider et al. ............ 713/168 |
| 6,550,011 | B1 * | 4/2003 | Sims, III ...................... 713/193 |
| 6,941,355 | B1 * | 9/2005 | Donaghey et al. ............ 709/220 |
| 7,127,613 | B2 * | 10/2006 | Pabla et al. ................... 713/171 |
| 2003/0088544 | A1 * | 5/2003 | Kan et al. ........................... 707/3 |
| 2003/0105720 | A1 | 6/2003 | Ishibashi |
| 2003/0163697 | A1 * | 8/2003 | Pabla et al. ................... 713/171 |
| 2003/0198351 | A1 * | 10/2003 | Foster et al. .................. 380/281 |
| 2004/0034582 | A1 * | 2/2004 | Gilliam et al. .................. 705/31 |
| 2004/0117490 | A1 * | 6/2004 | Peterka et al. ................ 709/229 |
| 2005/0076233 | A1 * | 4/2005 | Aarts et al. ................... 713/201 |
| 2006/0031351 | A1 * | 2/2006 | Marston et al. ............... 709/206 |

OTHER PUBLICATIONS

Tetsu Okui et al., "Avoiding unreliable message in anonymous peer-to-peer communication," Information Processing Society of Japan, research report vol. 2003, version 33, Mar. 20, 2003, pp. 49-54 and its English translation.

Naoki Itoh, "P2P Computing—technology description and applications", published by Soft Research Center Inc., Nov. 25, 2001, pp. 15-31 and its English translation.

Machine translation of paragraph [0054] of JP Application Publication No. 11-219329, published Aug. 10, 1999.

* cited by examiner

| Content ID | 1234 |
|---|---|
| Content Creator | TARO* |
| Source | ALICE |
| Destination | BOB |
| Validity Period (Expiration Date) | 2005.5.5 |
| Content Storage Place | d:¥content¥content1234 |

INFORMATION SECURITY DEVICE

TECHNICAL FIELD

The present invention relates to an information security device by which, after content information or the like is circulated by chain, the information security device can change a usage rule for the content information by tracing the same chain.

BACKGROUND ART

In recent years, with the spread of digital cameras, camera-equipped portable phones and the like, personal users have become able to easily create digital contents such as still pictures and moving pictures. Hereinafter, such digital contents created by personal users are referred to as personal contents. Further, an environment is being prepared that allows these personal contents to be transferred to a digital television set, a hybrid recorder, a portable device and the like for the purpose of viewing and listening. In association with this, occasions are increasing that personal contents are exchanged within a family or between friends. Thus, it is expected that circulation of such personal contents will be performed more actively in the future.

At present, an example of a circulation system for the personal contents is a peer-to-peer type file exchange system (see, for example, Non-Patent Reference 1). In the file exchange system, users on a network exchange personal contents between the users. In the file exchange system, a user who requests a personal content specifies, through the user's own terminal, the desired personal content to a terminal of a user who owns the personal content, and then downloads the personal content via the network. In the peer-to-peer type file exchange system, the user who has received the personal content can arbitrarily re-distribute the content to other users (secondary distribution). Thus, contents are circulated actively.

On the other hand, this secondary distribution would cause a difficulty in recognizing destinations of circulation of personal contents. As a management method for the distribution information of personal contents in the conventional art, a method is disclosed in which when a personal content is distributed sequentially by chain, a history management site manages in a concentrated manner the history concerning who sends a content to whom (see, for example, Patent Reference 1).

Non-Patent Reference 1: Naoki Ito, "P2P Computing—Technical Description and Application", Soft Research Center Inc., December, 2001

Patent Reference 1: Japanese Patent Application Publication No. 2001-256413

DISCLOSURE OF INVENTION

Problems that Invention is to Solve

In general, a personal content can contain private photography data and the like desired not to be provided to unspecified persons. Thus, a user (creator user) who created a personal content desires to limit the distribution range for the created personal content.

However, in the conventional art described in Non-Patent Reference 1, regardless of the intention of a creator user, a user who received the personal content has been allowed to re-distribute the received content (secondary distribution). That is, a problem is present that secondary distribution of a personal content having been released from a creator user cannot be controlled by the creator user.

On the other hand, in the conventional art described in Patent Reference 1, information concerning to which each user has circulated the personal content is managed in a concentrated manner. This information is associated with information concerning the user's friend relationship, and hence with the privacy. Thus, the fact that such information is managed by any other person is unpleasant for the user. Further, also from the viewpoint of the private information protection law, a large risk is generated to the management side in the operation of the management site. This causes a problem.

The present invention aims to solve the problems in the conventional arts. An object of the present invention is to provide an information security device by which, without the necessity of concentrated management of information concerning destinations circulated by each user, a usage rule for the circulated personal content can be changed or deleted (collected), by tracing afterward the same chain as used in the personal content distribution.

Means to Solve the Problems

In order to solve the problems in the conventional arts, the information security device according to the present invention receives content information from a source device, uses the content information, and sends the content information to a destination device. The information security device includes: a receiving unit operable to receive, from the source device, at least one of the content information, a usage rule of the content information, and a rule change command for instructing to change the usage rule; a content information storage unit operable to store the content information and the usage rule; a control unit operable to change the usage rule based on the rule change command; and a sending unit operable to send, to the destination device, at least one of the content information, the usage rule, and the rule change command.

According to this configuration, when the control unit changes the usage rule in response to a rule change command, even after the distribution of a content, the usage rule can be changed or the content can be collected (deleted).

Furthermore, the information security device according to the present invention also includes: a chain information generation unit operable to generate, as chain information of the content information, information including at least one of an identifier of the content information, an identifier of the source device which has sent the content information, an identifier of a device which has created the content information, an identifier of the destination device to which the content information is sent; and a chain information storage unit operable to store the chain information, wherein the control unit is operable to change the usage rule of the content information for which the rule change command is issued, by referring to the chain information of the content information for which the rule change command is issued.

According to this configuration, the control unit can change the usage rule with reference to the chain information, and can manage the content information.

Here, in order to achieve the above-mentioned object, the present invention may be implemented in the form of an information security method that includes as the steps the characteristic units of the information security device, or alternatively in the form of a program that causes a computer to execute the individual steps. It goes without saying that such a program can be distributed through a recording medium such as a CD-ROM and a transmission medium such as the Internet.

EFFECTS OF THE INVENTION

According to the information security device of the present invention, after the distribution of a content such as a personal content through a network, the user can reliably change the rule or collect (delete) the content. This allows own-created personal contents to be distributed or opened to the public onto the network more at ease.

NUMERICAL REFERENCES 100,200,300 Information security device
201 Receiving unit
202 Content storage unit
203 Collection command confirmation unit
204 Content deletion unit
205 Chain information storage unit
206 Destination list storage unit
207 Sending unit
208 Control unit
209 Content reproduction unit
701 Determination unit
702 Time management unit
703 Device default value storage unit
704 External input unit
705 Collection command generation unit
706 Chain information notification unit

BEST MODE FOR CARRYING OUT THE INVENTION

Embodiments of the present invention are described below with reference to the drawings. Here, description is given for an exemplary case where a content is circulated and, after that, the content is collected (deleted). Moreover, it is also possible to change a usage rule without collecting the content. Here, it is assumed that each information security device is a correct device that obeys a collection command when the command is issued.

First Embodiment

Figure 1:
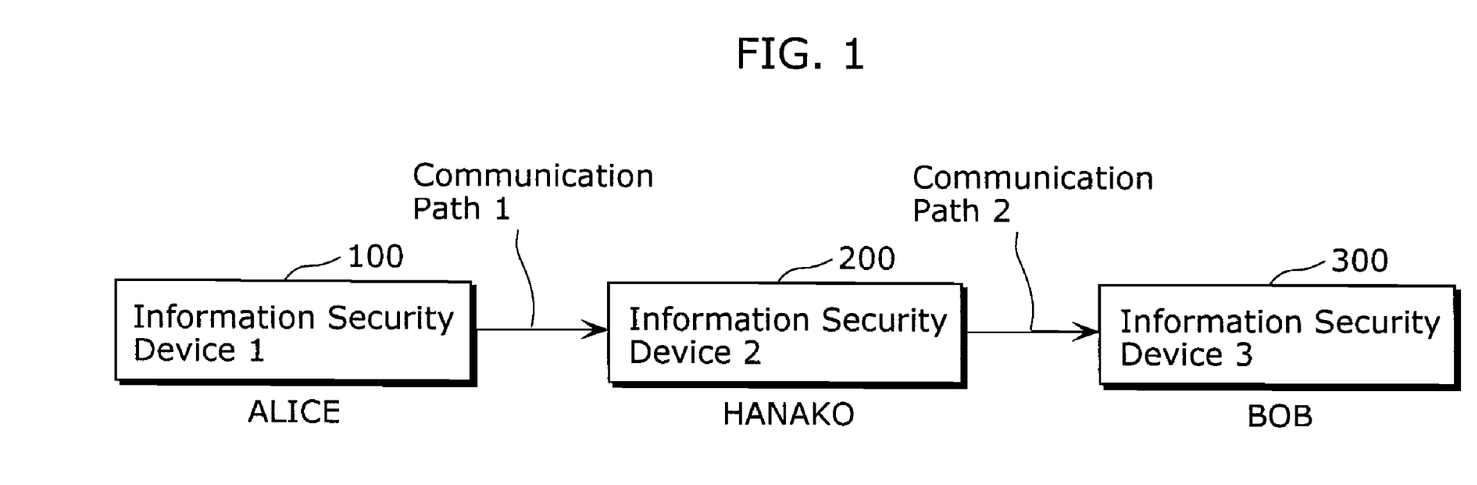
FIG. 1 is a diagram showing an example of an overall configuration of an information security system according to the first embodiment of the present invention.

FIG. 1 is a diagram showing an example of an overall configuration of an information security system according to the first embodiment of the present invention.

In FIG. 1, the information security system includes three information security devices connected sequentially via a communication path 1 and a communication path 2. These information security devices are an information security device 1 (100), an information security device 2 (200) and an information security device 3 (300). Note that, although FIG. 1 shows the three information security devices, the number of the devices may be less than three, or may be equal to or more than four. Here, for the purpose of description, users of the information security devices 1, 2, and 3 are named ALICE, HANAKO and BOB, respectively.

The information security device is a computer device such as a personal computer, or alternatively a so-called information processing terminal such as a home electronic device (for example, a digital television set, a videocassette recorder, a DVD recorder and a hard disk recorder), a set-top box, a portable phone, a PHS, a digital still camera, a digital video camera, a multimedia reproduction terminal, a PDA (Personal Digital Assistant), a car-carried information terminal and a dedicated portable terminal that can perform the processing of input, output, storage and the like of information. Each communication path is an information medium that is implemented by the Internet, a telephone line, a wireless communication or the like so as to allow mutual communication between the information processing terminals.

Here, the description of this figure is given for the case that the information security devices send and receive a content in a one-to-one manner. However, the information security devices may send and receive a content in a one-to-many manner or in a many-to-one manner.

Figure 2:
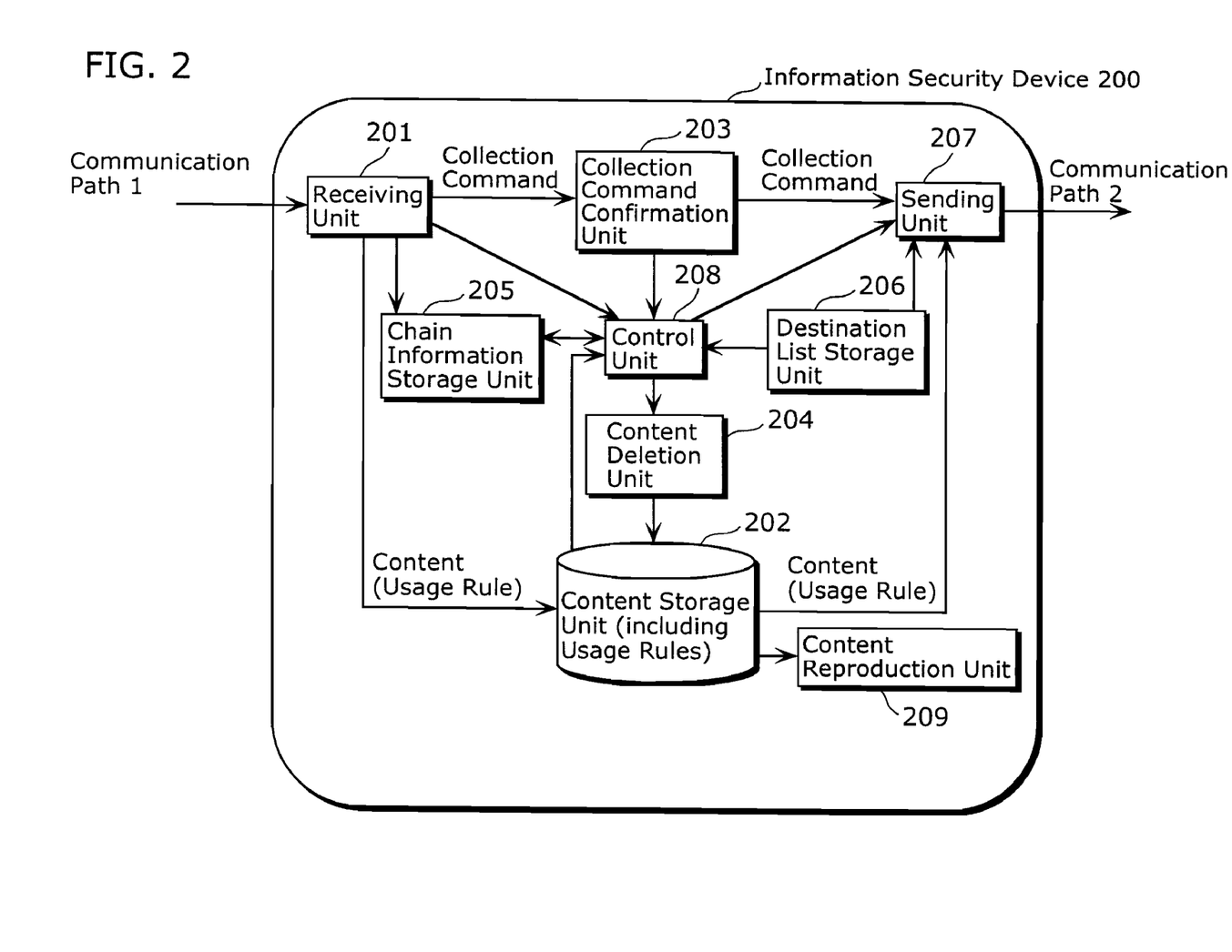
FIG. 2 is a block diagram showing a configuration of an information security device according to the first embodiment of the present invention.

FIG. 2 is a diagram showing an example of the internal configuration of the information security device 2 in FIG. 1. The information security devices 1 and 3 may have a similar configuration. The information security device 2 receives a content from the information security device 1 so as to accumulate and use the content, and at the same time, sends the content to the information security device 3.

In FIG. 2, the information security device 200 includes: a receiving unit 201 that receives a content and a collection command from the information security device 1 via the communication path 1; a content storage unit 202 that stores a content and its usage rule; a collection command confirmation unit 203 that checks the validity of a received collection command; a content deletion unit 204 that deletes a content; a chain information storage unit 205 that stores chain information containing the sending and receiving information of a content; a destination list storage unit 206; a sending unit 207 that sends a content and a collection command to the information security device 3 via the communication path 2; a control unit 208 that controls the processing of a collection command; and a content reproduction unit 209 that reproduces a content with reference to the content and the usage rule.

Figure 3:
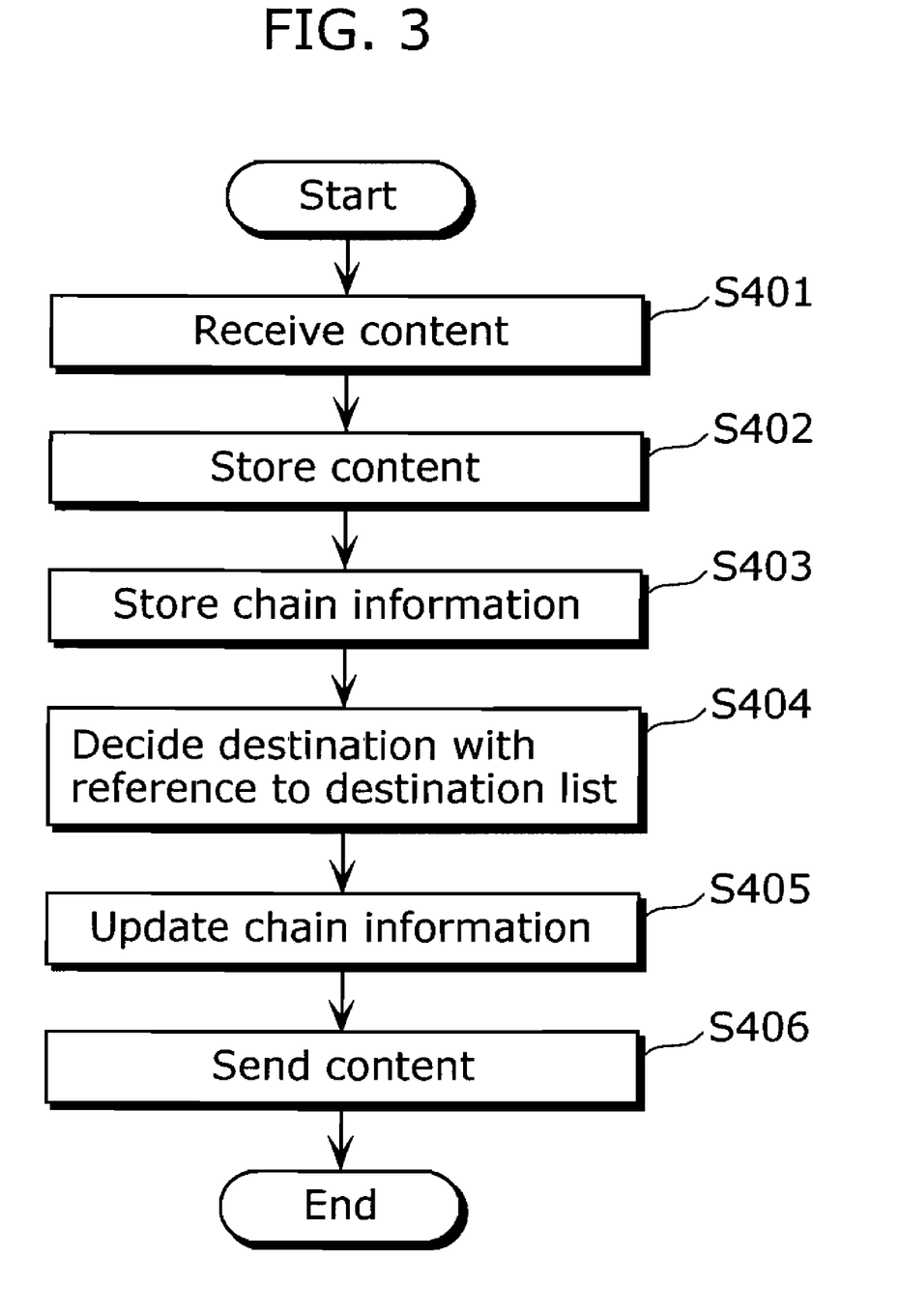
FIG. 3 is a flow chart showing an example of operation of the information security device at the time of content distribution according to the first embodiment of the present invention.

FIG. 3 shows an example of operation performed when a content is received. Description is given with reference to FIG. 2.

The receiving unit 201 receives a content via the communication path 1 (step S401). The ID of this content is assumed to be 1234. Although not described here in detail, a usage rule for the content may be received at the same time as the content receiving. Here, the usage rule sets forth, for example, that the reproduction is permitted by a predetermined number of times.

The receiving unit 201 stores the received content into the content storage unit 202 (step S402). Further, when the usage rule for the content is received, the usage rule is also stored into the content storage unit 202.

Then, the receiving unit 201 stores content information (a content ID, a content creator, a content storage place, a content importance and the like) and sender information (source information) as chain information into the chain information storage unit 205 (step S403).

After the receiving unit 201 completes the chain information storage processing, the control unit 208 determines a destination with reference to a destination list stored in the destination list storage unit 206 (step S404). Detailed description is given for the case that, for example, the sending list storage unit 206 holds as a sending list in which user information (a user ID, a user name and the like), a destination address (communication destination information such as a telephone number, an IP address, a mail address and the like) and the trustability of each user are associated with each other. The importance added to the content to be processed is compared with the trustability in the sending list, so that destinations are determined. For example, the trustability is expressed by a number between 0 and 100 (a greater number indicates a higher trustability). Then, as for a content having a predetermined importance or higher, users having a trustability of 80 or higher are selected as destinations. Here, it is assumed that the owner HANAKO of the information security device 2 trusts BOB so that the information security device 3 owned by BOB is selected as a destination of the content 1234.

The control unit 208 stores the determined destination as the destination information into the chain information, so as to update the chain information stored in the chain information storage unit 205 (step S405).

The sending unit 207 sends the content to the destination (information security device 3) determined by the control unit 208 (step S406).

Here, before and after sending the content to the information security device 3, the user HANAKO of the information security device 2 can use (reproduce) the content in the content storage unit 202 by using the content reproduction unit 209, and hence can confirm the information of the target content before and after the content distribution.

Figure 4:
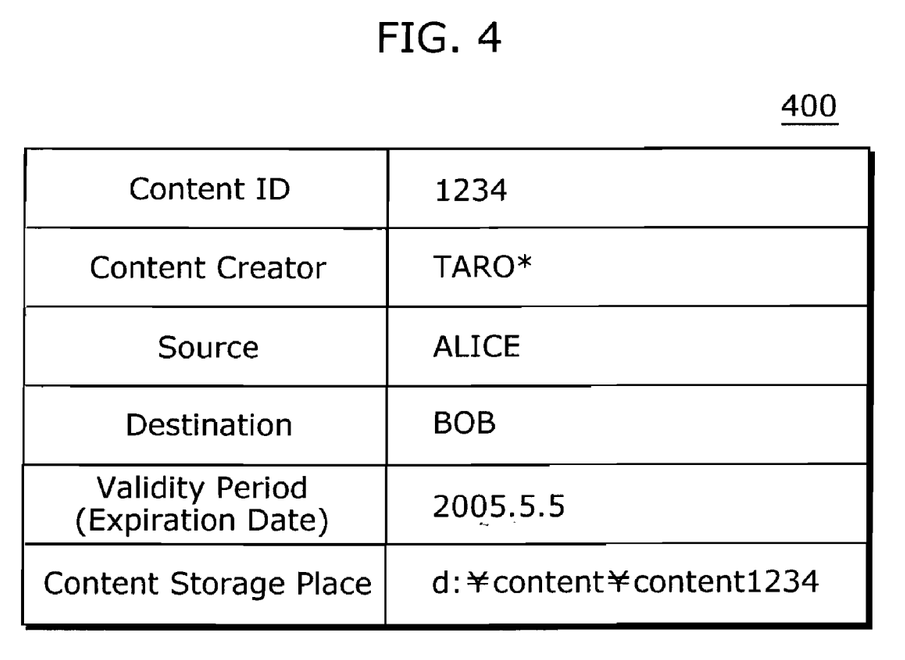
FIG. 4 is a diagram showing an example of chain information according to the first embodiment of the present invention.

FIG. 4 shows an example of the chain information 400 processed at step S403 or S405 in FIG. 3.

The content ID (1234) and the content creator (name) are recorded with reference to the information added to the content. Further, in this example, the user of the information security device 1 is ALICE, while the user of the information security device 3 is BOB. Thus, the content source is ALICE, while the destination is BOB. Further, the content storage place is information that indicates the storage position in the content storage unit 202. The validity period described here indicates a period until when the chain information need be held. Thus, before or on the date, when a collection command is received through the same route, the collection command can be circulated through the same route as the circulation chain of the content. In the example of FIG. 4, the chain information is not allowed to be deleted until 2005.5.5. Thus, until this date, a collection command can be send to the next with reference to the chain information. On the other hand, on or after 2005.5.6, the chain information is allowed to be deleted. Thus, a collection command is not ensured to be distributed appropriately.

Figure 5:
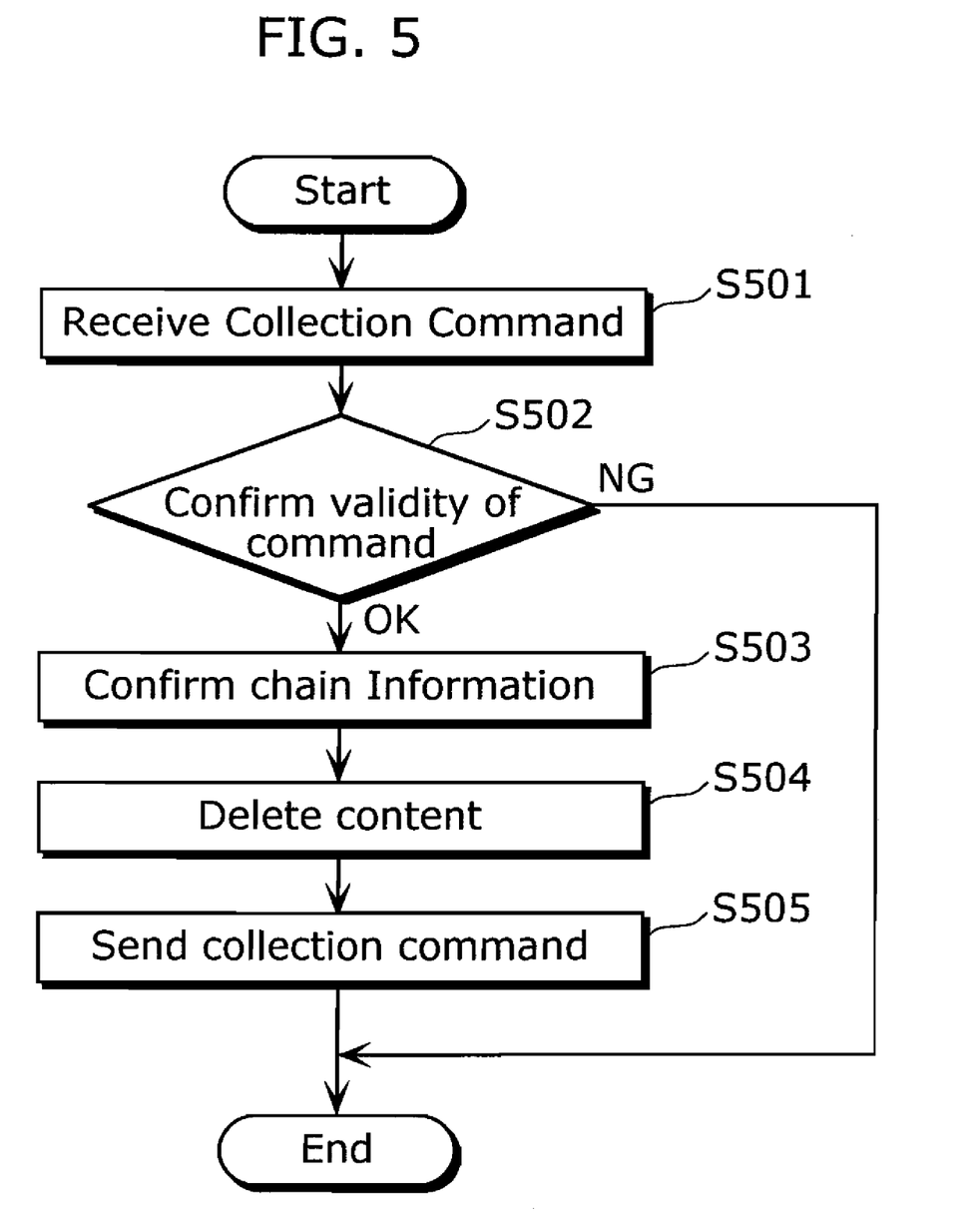
FIG. 5 is a flow chart showing an example of operation of the information security device at the time of content collection according to the first embodiment of the present invention.

FIG. 5 shows processing that after the circulation of a content described in FIG. 3, the content 1234 is collected, that is, deleted, in the destination of circulation in accordance with the intention of the content creator TARO.

The receiving unit 201 receives a collection command via the communication path 1 (step S501).

The collection command confirmation unit 203 checks the validity of the received collection command (step S502). In this example, the digital signature of the content creator TARO is checked so that the collection command is confirmed as not unauthorized one. If the collection command is unauthorized one (NG at step S502), then the processing is terminated. On the other hand, if the collection command is authorized one (OK at step S502), then the procedure goes to step S503.

The control unit 208 acquires from the chain information storage unit 205 the chain information of the content corresponding to the collection command, and then checks the information (step S503). For example, in a case that the corresponding chain information is as shown in FIG. 4, it is recognized that the content was sent to BOB (information security device 3). Further, it is also recognized that the validity period for the holding of the chain information does not yet elapsed. This validity period indicates a period until when the chain information need be held. Thus, when the validity period has elapsed, the collection command may be determined as not to be circulated, so that the collection command may be circulated only within the validity period. Alternatively, the received collection command may be circulated regardless of the validity period. In this example, the processing is assumed to be performed regardless of the validity period.

In response to the collection command, the control unit 208 instructs the content deletion unit 204 to delete the target content. Then, the content deletion unit 204 deletes the content stored in the content storage unit 202 (step S504).

The control unit 208 sends the collection command to the destination (information security device 3) acquired from the chain information (step S505).

As a result, by sending a collection command after content distribution, an information security device can collect (delete) a content in a destination of circulation. This allows a content to be circulated at ease. Further, since the chain information remains in each information security device, no problem arises concerning privacy.

In the first embodiment described above, a collection command (a command that cancels or deletes an already circulated content) was circulated after the content distribution. However, a usage rule for the content may be changed. This approach is applicable to a case that a usage rule (for example, 10 times of viewing and listening) for a content is circulated simultaneously to or separately from the content distribution, and after that, the usage rule is changed (for example, into 20 times). Alternatively, also in a case that a usage validity period of 10 months is to be reduced into 3 months, this (kind of) command is circulated by tracing the same chain. Thus, based on the own convenience, a content creator can easily change afterward the usage mode of a content in an information security device in a distribution destination. This allows a content to be distributed and opened to the public onto the network more at ease.

Further, in the first embodiment described above, as the processing corresponding to a content collection command, the body of the content was deleted. Instead, a content usage non-permission flag may be set up. At the time of content usage, the usage is permitted only after this flag is confirmed to be in a permit state. Further, in a case that the content is saved in an encrypted state, its key may be deleted. Further, at the time of deletion, chain information may be deleted together with the content. Alternatively, which of these content deletion methods is to be adopted may be specified in a manner added to the content.

Further, the collection command confirmation unit 203 checked the digital signature of the content creator. Instead, the digital signature of the sender (that is, the information security device 1) may be checked. Further, which of these methods is to be adopted as the validity confirmation method for the command may be specified in a manner added to the content in advance. Then, only when a corresponding digital signature is confirmed, the collection command is accepted so that the processing is performed.

Further, the collection command confirmation unit 203 may determine whether the command is accepted, depending on the trustability of the destination. For example, when a collection command with the digital signature of a destination is sent from the destination having relative low trustability, the content need not be deleted depending on the setting.

Further, the validity period was expressed in the form of an expiration date. Instead, the validity period may be expressed as a relative period (for example, 30 days) after the content is sent. Further, its preciseness may be any one of day, hour, minute, and the like.

Further, the target content is not limited to a personal content such as a video and a photograph taken by an individual person, and may be a commercial content or text information such as word-of-mouth information.

Further, the collection command was issued by any other information security device (probably, the content creator). Instead, for example, in a case that the trustability of the destination is degraded substantially, the command may be issued from an intervening device under the permission of the content creator.

Further, the destination was determined from the trustability in the sending list and the importance of the content. However, the method is not limited to this. A list of friends or acquaintances may be generated, and then all the members may be adopted as destinations. Alternatively, an information security device which is present in an occasion and to which a communication path is established may be adopted as a destination.

Further, each information security device is assumed to be a correct device that obeys the command when a rule change command or a collection command is received. Thus, it is preferable that the information security devices first perform mutual authentication concerning whether they are correct devices. The authentication method may be a technique of challenge response in which, for example, a technique of public key encryption is used so that whether a certificate or a secret key distributed only to correct devices is owned is checked.

Further, the communication path is assumed to securely transfer the command or the content to the intended information security device. However, this does not indicate that the processing is performed in real time. When a transmission path cannot be established, connection may be tried several times, or alternatively the device may wait until connection is established. For example, when the communication path is a short-distance transmission path such as a PAN (Personal Area Network), the device may wait until the information security devices are located in the vicinity.

Further, the chain information and the destination list do not necessarily remain in the information security device. For example, they may be saved in a secure memory device having portability, and then may be used in a manner connected to an information security device when necessary.

Next, description is given for the case that for example, for the purpose of memory area saving, an information security device located in the middle of a chain deletes a content and chain information determined as unnecessary.

Figure 6:
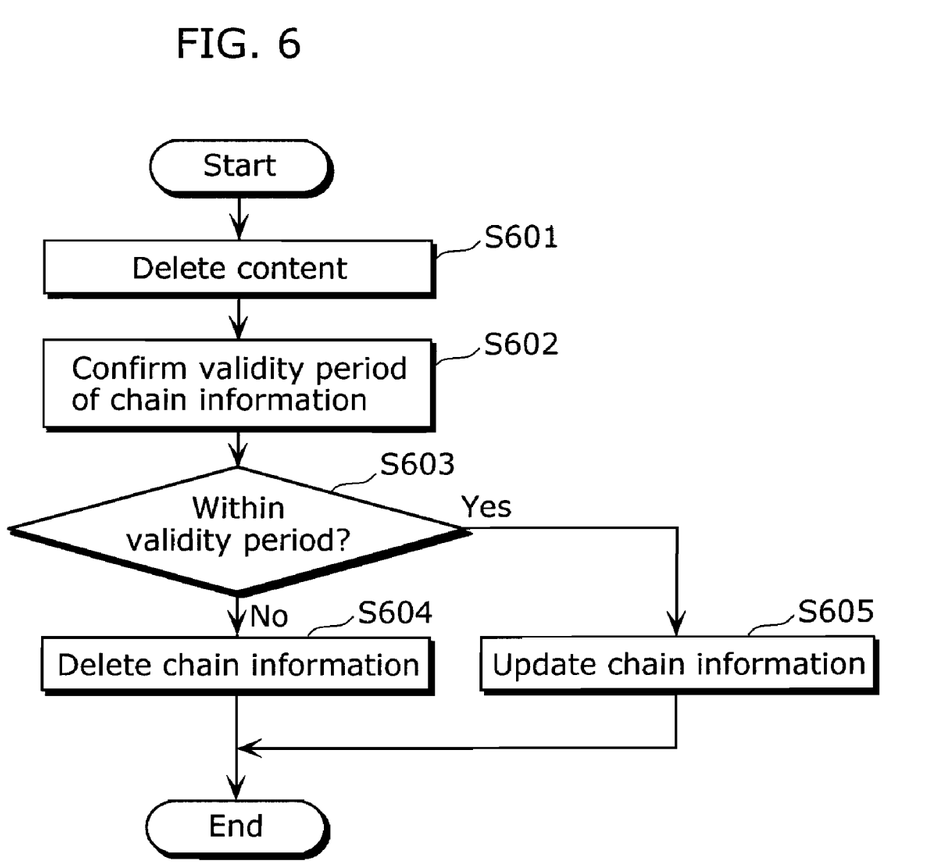
FIG. 6 is a flow chart showing processing that a content and its corresponding chain information are deleted in accordance with intention of the information security device according to the first embodiment of the present invention.

FIG. 6 shows the processing that in accordance with the intention of the information security device 2, chain information corresponding to a content 1234 is deleted. First, deletion of the content 1234 is determined, and then the processing is started.

The control unit 208 instructs the content deletion unit 204 to delete the content 1234 which is a content to be deleted. Then, the content deletion unit 204 deletes the content 1234 stored in the content storage unit 202 (step S601).

The control unit 208 acquires chain information corresponding to the content 1234 from the chain information storage unit 205, and checks the validity period (step S602).

Then, if the validity period has elapsed (NO at Step 603), then the control unit 208 deletes the corresponding chain information from the chain information storage unit 205 (step S604).

On the other hand, if the validity period has not yet elapsed (YES at step S603), then the control unit 208 does not delete and keeps the corresponding chain information in the chain information storage unit 205. However, the control unit 208 updates the item of the content storage place, and indicates that a corresponding content is not present (step S605).

As a result, an information security device can delete a content determined as unnecessary and still keep the chain information. Thus, when a collection command is received within the validity period, the collection command can be sent to a destination serving as the next content distribution destination.

Second Embodiment

Next, a second embodiment of an information security device according to the present invention is described below.

Figure 7:
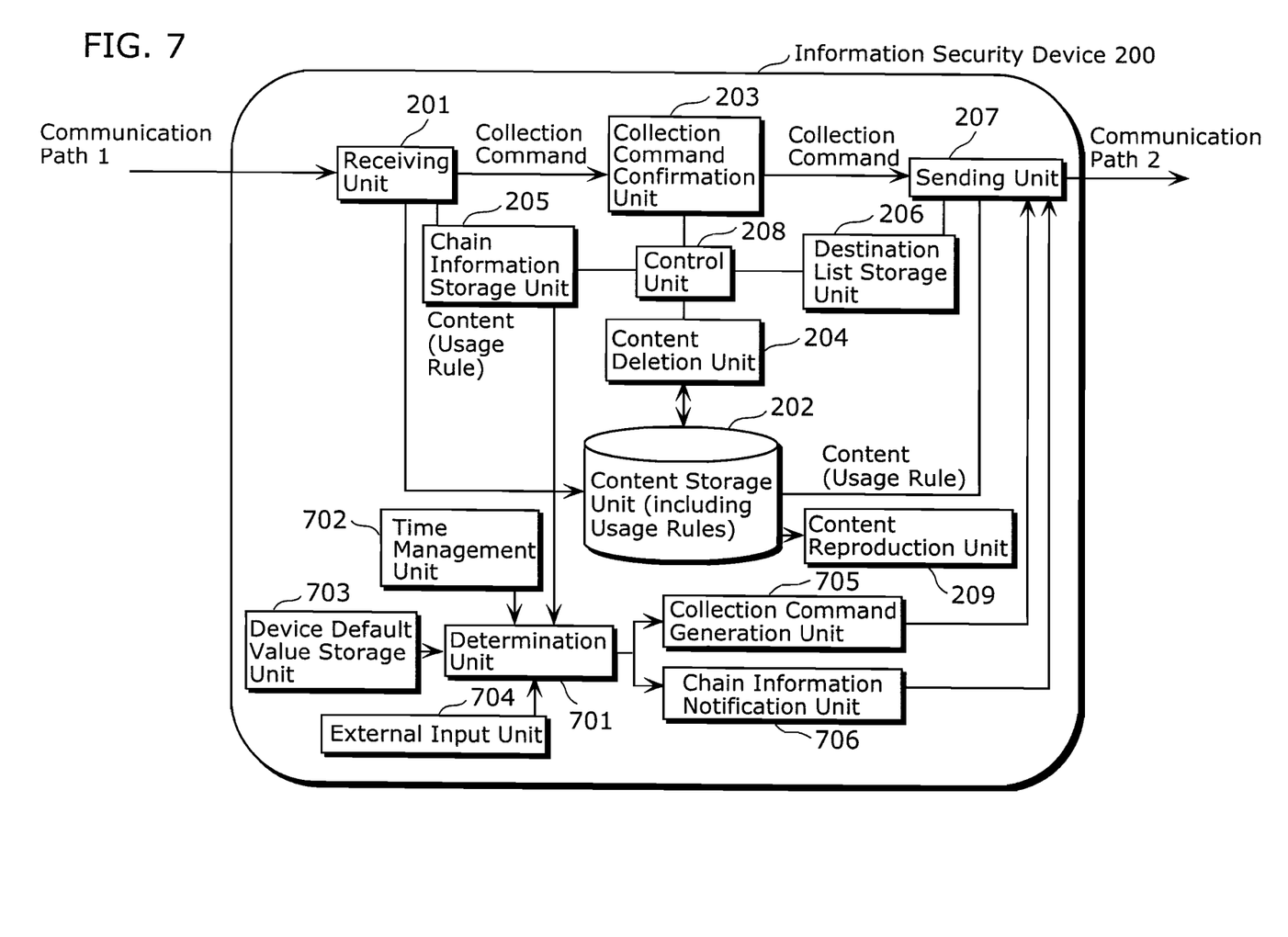
FIG. 7 is a functional block diagram of an information security device according to the second embodiment of the present invention.

FIG. 7 is a functional block diagram of an information security device 200 according to the second embodiment. Here, like parts to those in the configuration of FIG. 1 described above are designated by like numerals, and hence detailed description is omitted.

An external input unit 704 is a user interface such as a keyboard and a remote controller. When a user has determined to perform "middle skipping" which is collection of a content already held, the user can express the intention by using the external input unit 704. In the second embodiment, content collection methods that can be selected by the user include "middle skipping" methods (a) and (b) described below.

When "middle skipping" of a content is to be performed, the determination unit 701 determines whether "middle skipping" of the specified content is permitted, based on the usage rule for the content serving as the target of middle skipping stored in the content storage unit 202, the chain information stored in the chain information storage unit 205, a default value embedded in the device, a term and the like. Here, the usage rule for the content includes setting of the content provider concerning "middle skipping" which is content collection.

Then, in description of the second embodiment, two types of "middle skipping" are employed that achieve content collection. A first method of "middle skipping" (abbreviated as method (a), hereinafter) is a method that the entire chain information beyond HANAKO is disconnected. Specifically, HANAKO issues a collection command for the content 1234 to BOB, and thereby deletes the corresponding content and the related chain information from all the information security devices at and beyond BOB. In this "middle skipping" method (a), the entirety of the corresponding content can be collected (deleted) in the chain at and beyond oneself. Further, own friend list need not be notified to other devices.

A second method of "middle skipping" (abbreviated as method (b), hereinafter) is a method that the chain information held by the information security device 2 is notified to the information security device 1 serving as the source and the information security device 3 serving as the destination so that the devices serving as the destination and the source are connected directly by chain. Specifically, the information security device 2 notifies the information security device 1 of the information of BOB serving as the destination. In accordance with this, the information security device 1 rewrites the destination in the chain information from HANAKO into BOB. Further, the information security device 2 notifies the information security device 3 of the information of ALICE serving as the source. In accordance with this, the information security device 3 rewrites the source in the chain information from HANAKO into ALICE. As a result, when a collection command is received by ALICE, this command is sent directly to BOB. In this method, the chain information of HANAKO is transferred to ALICE and BOB. In this "middle skipping" method (b), in the content circulation linked by chain, the devices in the upstream and the downstream can be linked by chain with skipping own device only. Further, the device name of the destination device is notified to the source device, while the device name of the source device is notified to the destination device. Thus, a part of own friend list or the like need be disclosed.

Here, as described above, which of the above-mentioned methods (a) and (b) should be used is sent in advance as additional information of the content by the content creator. Thus, the information may be held in the chain information.

When the user selects the above-mentioned middle skipping method (a) through the external input unit 704, a collection command generation unit 705 refers to the chain information and generates a collection command for instructing the destination device to collect the target content.

When the user selects the above-mentioned middle skipping method (b) through the external input unit 704, via the sending unit 207, a chain information notification unit 706 sends at least the identifier of the content information and the identifier of the destination device to the source device described in the chain information, and notifies at least the identifier of the content information and the identifier of the source device to the destination device described in the chain information.

Figure 9:
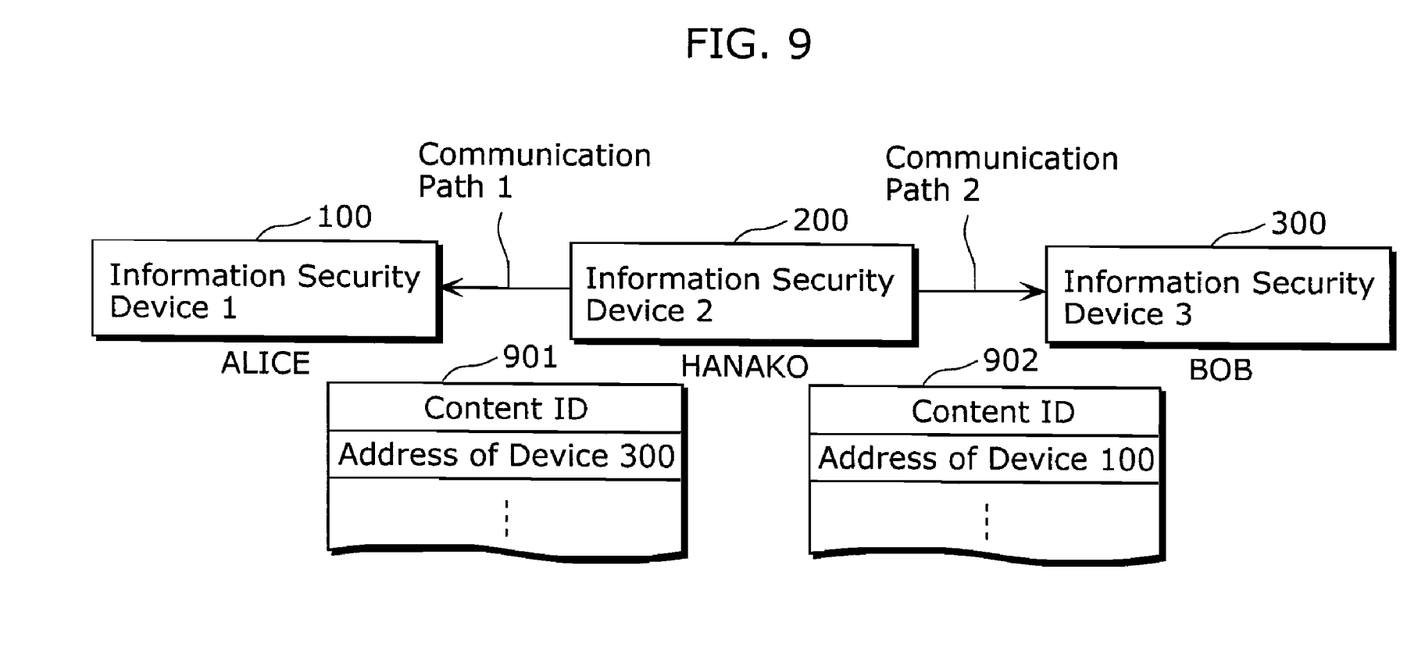
FIG. 9 is a diagram showing an example of information sent from an information security device having a chain information notification unit to an information security device serving as a destination and an information security device serving as a source.

FIG. 9 shows an example of information sent from the information security device 200 having the chain information notification unit 706 to the information security device 300 serving as the destination and the information security device 100 serving as the source in the case that the user selects middle skipping (b).

The information security device 200 sends, to the information security device 100, information 901 that contains at least a content ID serving as the identifier of the content information and the address of the information security device 300 serving as the destination device and sends, to the information security device 300, information 902 that contains at least a content ID serving as the identifier of the content information and the address of the information security device 100 serving as the destination device. Further, a time management unit 702 of the information security device 200 holds time information for performing date management. A device default value storage unit 703 manages a default value and the like for each device in accordance with the necessity of the maker.

Figure 8:
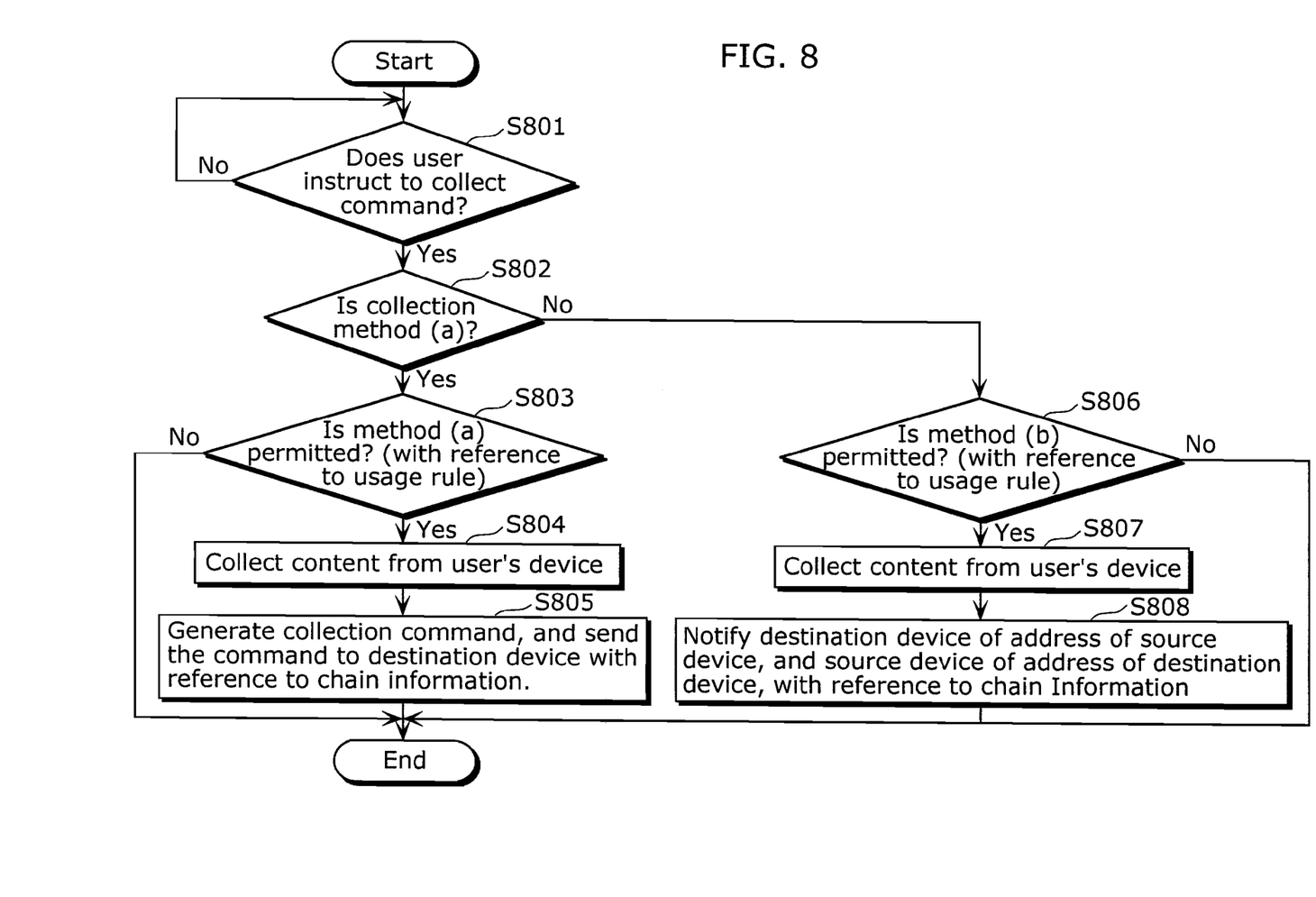
FIG. 8 is a flow chart showing an operation procedure of performing "middle skipping" of a content in the information security device according to the second embodiment of the present invention.

FIG. 8 is a flow chart showing an operation procedure of performing "middle skipping" of a content in an information security device according to the second embodiment.

Filter, the determination unit 701 checks whether a command for "middle skipping" has been issued from the user of the information security device via the external input unit 704 (step S801).

Then, if a command for "middle skipping" has been issued from the user (Yes at Step S801), then the determination unit 701 determines whether the method of "middle skipping" instructed by the user via the external input unit 704 corresponds to method (a) described above (step S802).

Then, if the determination unit 701 determines that the method corresponds to method (a) (Yes at Step S802), then the usage rule for the content onto which middle skipping is to be performed is acquired from the content storage unit 202 so that it is checked whether the method (a) is permitted as a middle skipping method set up by the content provider (step S803). In addition, the time information from the time management unit 702 and the device default values from the device default value storage unit 703 are checked. Then, if the method (a) is determined as permitted (Yes at Step S803), then the content stored in the content storage unit 202 is collected (step S804). At the same time, with the chain information being referred to, the collection command generation unit 705 is instructed to generate to the destination device a collection command for the content onto which middle skipping is to be performed. Then, the sending unit 207 sends the collection command generated by the collection command generation unit 705 to the information security device serving as the destination to which a content has already been sent (step S805). This collection command describes at least: a content ID; command of content collection; and information concerning the own device serving as the source.

On the other hand, if the determination unit 701 determines that the method of "middle skipping" instructed by the user does not correspond to method (a), that is, the method is (b) (No at Step S802), the usage rule for the content onto which middle skipping is to be performed is acquired from the content storage unit 202 so that it is checked whether the method (b) is permitted as a middle skipping method set up by the content provider (step S806). In addition, the time information from the time management unit 702 and the device default values from the device default value storage unit 703 are checked. Then, if the method (b) is determined as permitted (Yes at Step S806), the content stored in the content storage unit 202 is collected (step S807). At the same time, with reference to the chain information, as described above in FIG. 9, the chain information notification unit 706 sends, to the information security device 100, information that contains at least a content ID serving as the identifier of the content information and the address of the information security device 300 serving as the destination device and sends, to the information security device 300, information that contains at least a content ID serving as the identifier of the content information and the address of the information security device 100 serving as the destination device (step S808). Then, a series of processing is completed.

Here, in the information security device having received the notification from the chain information notification unit 706, when processing of updating the address information of the destination device or the source device described in the chain information is performed, the processing of content collection and the like between the subsequent devices can appropriately be linked by chain.

Further, as a detailed example that the user of the information security device 200 performs "middle skipping" which is a content collection method, for example, the content provider has set up as a usage rule the above-mentioned method (b) of middle skipping for a content. However, the device owner having received the content does not desire to inform own friend relationship to the upstream and downstream devices serving as the destination and the source. In such a situation, "middle skipping" of the content is abandoned in some cases. Alternatively, the content provider has specified the above-mentioned method (a) of middle skipping for a content. However, the device owner does not desire the content deletion in the subsequent device. Also in such a situation, middle skipping is abandoned in some cases. Further, the content provider has set up the usage rule such that both of the above-mentioned methods (a) and (b) are adoptable as the method of middle skipping. Then, in some cases, since the device owner knew that the source device and the destination device in the upstream and the downstream are friends with each other, the device owner notifies the users of these devices, and then method (b) is selected as the method of middle skipping. Further, in some cases, since the validity period of the chain information has elapsed, the content and the chain information are deleted without performing middle skipping of the above-mentioned (a) or the above-mentioned (b).

As described above, in the information security device according to the second embodiment, when a user performs "middle skipping" for content collection, the determination unit 701 refers to the usage rule so as to acquire the content collection method having been set up as permit by the content provider, then refers to the chain information so as to acquire the address information of the destination device and the source device and the validity period of the chain information and the like, and thereby determines the permit or non-permit of "middle skipping" of the content specified by the user. Thus, as for the content collection method, the intention of the content owner is respected. Within this restriction, content collection is achieved in a manner that the intention of the device owner such as deletion of the content is reflected.

Further, in the information security device according to the second embodiment, similarly to the above-mentioned the first embodiment, chain information is saved in each information security device. By virtue of this, the usage rule a personal content having already been circulated can be changed afterward by tracing the same chain as that used in the content distribution. Further, deletion (collection) is also achievable. Since chain information that relates to privacy is saved only in individual information security devices, no probable arises. Further, when a validity period for the holding of the chain information is set up, within this validity period, it is ensured that collection is achieved reliably. Further, in a case that the chain information is to be deleted within the validity period because of a necessity in the information security device, within the validity period, collection is reliably achieved when the chain information is notified to the information security devices located in the upstream and the downstream. Since, collection is ensured, each user can circulate a personal content at ease and in comfort.

(Other Modifications)

The present invention has been described with reference to the embodiments given above. However, the present invention is obviously not limited to the above-mentioned embodiments. The following configurations are included in the scope of the present invention.

(1) Each of the above-mentioned devices is, specifically, a computer system constructed from a microprocessor, a ROM, a RAM, a hard disk unit, a display unit, a keyboard, a mouse and the like. The RAM or the hard disk unit stores a computer program. When each microprocessor operates in accordance with the computer program, each device achieves the function. Here, the computer program is constructed in the form of a combination of a plurality of command codes that describe commands to the computer in order to realize a predetermined function.

(2) Part or all of the components that constitutes each device described above may be constructed from a single system LSI (Large Scale Integration). The system LSI is a super-multifunction LSI manufactured by accumulating a plurality of component units onto a single chip and is, specifically, a computer system constructed in a manner including a microprocessor, a ROM, a RAM and the like. The RAM stores a computer program. When the microprocessor operates in accordance with the computer program, the system LSI achieves the function.

(3) Part or all of the components that constitutes each device described above may be constructed from an IC card or a single module that can be attached to and detached from each device. The IC card or the module is a computer system constructed from a microprocessor, a ROM, a RAM and the like. The IC card or the module may include the above-mentioned super-multifunction LSI. When the microprocessor operates in accordance with the computer program, the IC card or the module achieves the function. The IC card or the module may have tamper proofness.

(4) The present invention may be a method described above. Further, the present invention may be a computer program for implementing the method on a computer, or alternatively a digital signal composed of this computer program.

Further, the present invention may be a computer-readable recording medium such as a flexible disk, a hard disk, a CD-ROM, an MO, a DVD, a DVD-ROM, a DVD-RAM, a BD (Blu-ray Disc) and a semiconductor memory that records the computer program or the digital signal described above. Further, the present invention may be the above-mentioned digital signal recorded on this recording media.

Further, in the present invention, the computer program or the digital signal may be transmitted through a telecommunication line, a wireless or cable communication line, a network represented by the Internet, data broadcasting and the like.

Further, the present invention may be a computer system that includes a microprocessor and a memory. Then, the memory may store the above-mentioned computer program, while the microprocessor may operate in accordance with the computer program.

Further, the program or the digital signal may be transported in a form recorded on a recording medium. Alternatively, the program or the digital signal may be transported via the above-mentioned network or the like. Then, the program or the digital signal may be executed on another independent computer system.

(5) The above-mentioned embodiments and the above-mentioned modifications may be combined with each other.

INDUSTRIAL APPLICABILITY

The information security device according to the present invention is useful, for example, in a computer device having a content sending and receiving function and in an information processing terminal such as a home electric appliance, a portable phone and an AV device. Further, the device according to the present invention is applicable also to a digital camera or the like having a communication function. Furthermore, the present invention is applicable also to the circulation of commercial contents in addition to that of personal contents.

The invention claimed is:

1. An information security device which receives content information from a source device, uses the content information, and sends the content information to a destination device, said information security device comprising:
a receiving unit which receives, from the source device, the content information and a usage rule of the content information;
a content information storage unit which stores the content information and the usage rule;
a sending unit which sends, to the destination device, the content information and the usage rule:
a chain information generation unit which generates, as chain information of the content information, information including at least an identifier of the destination device to which the content information is sent;
a determination unit which determines whether or not the usage rule of the content information is permitted to be changed;
a rule change command generation unit which generates a rule change command for instructing to change the usage rule of the content information, the rule change command being issued for the destination device having the identifier indicated in the chain information, when said determination unit determines that the usage rule of the content information is permitted to be changed; and
a control unit which changes the usage rule based on the rule change command,
wherein said control unit deletes the content information stored in said content information storage unit, when said determination unit determines that the usage rule of the content information is permitted to be changed, and
said sending unit sends the rule change command generated by said rule change command generation unit, to the destination device having the identifier indicated in the chain information.

2. The information security device according to claim 1, wherein the rule change command received by said receiving unit is an invalidation command for instructing to make corresponding content information invalid, the corresponding content information being stored in said content information storage unit,
said control unit makes use of the content information invalid, according to the invalidation command, and
said sending unit sends the invalidation command to the destination device to which the content information to be invalid has been sent.

3. The information security device according to claim 2, wherein said control unit makes the use of the content information invalid, by deleting the content information to be invalid from said content information storage unit.

4. The information security device according to claim 2, wherein said control unit makes the use of the content information invalid, by prohibiting use of use permission information included in the usage rule of the content information to be invalid.

5. The information security device according to claim 2, wherein said content information storage unit further stores a key used in encrypting the content information, and
said control unit makes the use of the content information invalid, by deleting the key used for the content information to be invalid from said content information storage unit.

6. The information security device according to claim 1, further comprising
a command conformation unit which confirms validity of the rule change command,
wherein said control unit changes the usage rule, when said command confirmation unit confirms validity of the rule change command.

7. The information security device according to claim 6, wherein said command confirmation unit confirms the validity of the rule change command, by using one of: digital signature of a sender of the rule change command; and digital signature of a creator of the content information.

8. The information security device according to claim 1, wherein said control unit changes the usage rule of the content information for which the rule change command is issued, based on trustability of the source device which has sent the rule change command.

9. The information security device according to claim 1, wherein the chain information further includes at least one of an identifier of the content information, an identifier of the source device which has sent the content information, and an identifier of a device which has created the content information,
said information security device further comprises
a chain information storage unit which stores the chain information, and
said control unit changes the usage rule of the content information for which the rule change command is issued, by referring to the chain information of the content information for which the rule change command is issued.

10. The information security device according to claim 9, wherein said chain information further includes information which designates at least one of: a method of confirming validity of the rule change command; and a method of changing the usage rule,
said command confirmation unit confirms the validity of the rule change command, by using the method designated by the chain information, and
said control unit changes the usage rule, when said command confirmation unit confirms the validity of the rule change command.

11. The information security device according to claim 9, wherein the chain information further includes a validity period of the rule change command, and
said control unit: refers to the chain information corresponding to the content information for which the rule change command is issued; and changes the usage rule when the rule change command is within the validity period.

12. The information security device according to claim 11, wherein the chain information further includes a validity period of the chain information, and
said control unit: changes the usage rule of the content information for which the rule change command is issued, when the chain information is within the validity period of the chain information; and permits the deletion of the chain information, when the validity period of the chain information is expired.

13. The information security device according to claim 9, further comprising:
an external input unit which receives, from outside, the content information which is stored in said content information storage unit, and a command to change the usage rule of the content information which said sending unit has already sent to the destination device;
a device default value storage unit which stores a default value which is previously given to said information security device; and
a time management unit which manages time information,
wherein said determination unit determines whether or not the usage rule of the content information is permitted to be changed, by using one of information from said external input unit, said time management unit, and one of information stored in said device default value storage unit and said chain information storage unit.

14. The information security device according to claim 13, wherein the rule change command includes at least an identifier of the content information, a command to change the usage rule of the content information, and information of said device which is the source device.

15. The information security device according to claim 13, wherein said external input unit receives, from outside, a command for deleting only the content information stored in said content information storage unit, and
said information security device further comprising
a chain information notification unit which, when the command is received via said external input unit, notifies, via said sending unit: the source device of at least an identifier of the content information and an identifier of the destination device; and the destination device of at least the identifier of the content information and an identifier of the source device.

16. The information security device according to claim 1, wherein said control unit: changes the usage rule command, depending on trustability of the destination device; and sends the changed usage rule to the destination device.

17. An information security system in which content information and a usage rule of the content information are sent along a route from a first information security device to a second information security device, and then from the second information security device to a third information security device, and a rule change command of the usage rule is sent tracing the same route,
wherein said second information security device includes:
a receiving unit which receives, from said first information security device, the content information and a usage rule of the content information;
a content information storage unit which stores the content information and the usage rule;
a sending unit which sends, to said third information security device, the content information and the usage rule;
a chain information generation unit which generates, as chain information of the content information, information including at least an identifier of the third information security device to which the content information is sent;
a determination unit which determines whether or not the usage rule of the content information is permitted to be changed;
a rule change command generation unit which generates the rule change command for instructing to change the usage rule of the content information, the rule change command being issued for the third information security device having the identifier indicated in the chain information, when said determination unit determines that the usage rule of the content information is permitted to be changed; and
a control unit which changes the usage rule based on the rule change command,
wherein said control unit deletes the content information stored in said content information storage unit, when said determination unit determines that the usage rule of the content information is permitted to be changed, and
said sending unit sends the rule change command generated by said rule change command generation unit, to the third information security device having the identifier indicated in the chain information.

18. The information security system according to claim 17, wherein
the chain information includes at least one of an identifier of the content information, an identifier of the first information security device which has sent the content information, and an identifier of a device which has created the content information,
said second information security device further comprises a chain information storage unit which stores the chain information, and
said control unit changes the usage rule of the content information for which the rule change command is issued, by referring to the chain information of the content information for which the rule change command is issued.

19. An information security method of receiving content information from a source device, using the content information, and sending the content information to a destination device, said information security method comprising:
receiving, from the source device, the content information and a usage rule of the content information;
storing the content information and the usage rule;
sending, to the destination device, the content information and the usage rule;
generating, as chain information of the content information, information including at least an identifier of the destination device to which the content information is sent;
determining whether or not the usage rule of the content information is permitted to be changed;
generating the rule change command for instructing to change the usage rule of the content information, the rule change command being issued for the destination device having the identifier indicated in the chain information, when it is determined in said determining that the usage rule of the content information is permitted to be changed; and
controlling to change the usage rule based on the rule change command,
wherein said controlling includes deleting the content information stored in said storing, when it is determined in said determining that the usage rule of the content information is permitted to be changed, and said sending includes sending the rule change command generated in said generating of the rule change command, to the destination device having the identifier indicated in the chain information.

20. A control program stored on a non-transitory computer-readable medium for an information security device which receives content information from a source device, uses the content information, and sends the content information to a destination device, said control program causing a computer to execute:

receiving, from the source device, the content information and a usage rule of the content information;

storing the content information and the usage rule;

sending, to the destination device, the content information and the usage rule;

generating, as chain information of the content information, information including at least an identifier of the destination device to which the content information is sent;

determining whether or not the usage rule of the content information is permitted to be changed;

generating the rule change command for instructing to change the usage rule of the content information, the rule change command being issued for the destination device having the identifier indicated in the chain information, when it is determined in said determining that the usage rule of the content information is permitted to be changed; and controlling to change the usage rule based on the rule change command, wherein said controlling includes deleting the content information stored in said storing, when it is determined in said determining that the usage rule of the content information is permitted to be changed, and said sending includes sending the rule change command generated in said generating of the rule change command, to the destination device having the identifier indicated in the chain information.

21. An integrated circuit configured for an information security device which receives content information from a source device, uses the content information, and sends the content information to a destination device, said integrated circuit comprising:

a receiving unit which receives, from the source device, the content information and a usage rule of the content information;

a content information storage unit which stores the content information and the usage rule;

a sending unit which sends, to the destination device, the content information and the usage rule;

a chain information generation unit which generates, as chain information of the content information, information including at least an identifier of the destination device to which the content information is sent;

a determination unit which determines whether or not the usage rule of the content information is permitted to be changed;

a rule change command generation unit which generates a rule change command for instructing to change the usage rule of the content information, the rule change command being issued for the destination device having the identifier indicated in the chain information, when said determination unit determines that the usage rule of the content information is permitted to be changed; and a control unit which changes the usage rule based on the rule change command, wherein said control unit deletes the content information stored in said content information storage unit, when said determination unit determines that the usage rule of the content information is permitted to be changed, and said sending unit sends the rule change command generated by said rule change command generation unit, to the destination device having the identifier indicated in the chain information.

* * * * *